US010050688B2

(12) United States Patent
Nammi

(10) Patent No.: US 10,050,688 B2
(45) Date of Patent: Aug. 14, 2018

(54) SINGLE CODEWORD, MULTI-LAYER SERIAL INTERFERENCE CANCELLATION (SIC) FOR SPATIAL MULTIPLEXING

(71) Applicant: AT&T INTELLECTUAL PROPERTY I, L.P., Atlanta, GA (US)

(72) Inventor: Sairamesh Nammi, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 27 days.

(21) Appl. No.: 15/407,246

(22) Filed: Jan. 16, 2017

(65) Prior Publication Data

US 2018/0205431 A1 Jul. 19, 2018

(51) Int. Cl.
H04W 4/00 (2018.01)
H04B 7/0456 (2017.01)
H04B 7/06 (2006.01)
H04L 1/18 (2006.01)

(52) U.S. Cl.
CPC ......... *H04B 7/0478* (2013.01); *H04B 7/0697* (2013.01); *H04L 1/1812* (2013.01); *H04L 1/1893* (2013.01); *H04L 1/1896* (2013.01)

(58) Field of Classification Search
CPC .. H04B 7/0478; H04B 7/0456; H04B 7/0639; H04L 1/1812; H04L 1/1896
See application file for complete search history.

(56) References Cited

U.S. PATENT DOCUMENTS

| 7,548,752 | B2 | 6/2009 | Sampath et al. |
| 7,830,977 | B2 | 11/2010 | Li et al. |
| 8,194,781 | B2 | 6/2012 | Han et al. |
| 8,223,854 | B2 | 7/2012 | Ghosh et al. |
| 8,379,536 | B2 | 2/2013 | Chen et al. |
| 8,675,509 | B2 | 3/2014 | Sampath et al. |

(Continued)

FOREIGN PATENT DOCUMENTS

EP 2583402 B1 12/2014

OTHER PUBLICATIONS

Berardinelli, Gilberto et al., "Transmission over multiple component carriers in LTE-A uplink", 2011, 15 pages.

(Continued)

*Primary Examiner* — Kevin C Harper
(74) *Attorney, Agent, or Firm* — Guntin & Gust, PLC; Ralph Trementozzi

(57) ABSTRACT

Aspects of the subject disclosure can include, for example, obtaining a first number of channel-encoded codewords based on a first group of transport blocks, and identifying a first logical codeword based on the first group of channel-encoded codewords and associated with one HARQ identifier. The first logical codeword is associated with multiple layers of a MIMO system to obtain a logical codeword mapping. A receiver detects the MIMO signal and obtains independent error detection results for each of the channel-encoded codewords. In response to detecting an error in one of the channel-encoded codewords, a modified first logical codeword is generated based on the one channel-encoded codeword and mapped to the number of layers of the MIMO s system for transmission to the receiver for further processing associated with the HARQ identifier. Other embodiments are disclosed.

20 Claims, 10 Drawing Sheets

(56) References Cited

U.S. PATENT DOCUMENTS

| | | | |
|---|---|---|---|
| 8,687,527 | B2 | 4/2014 | Jiang et al. |
| 8,711,963 | B2 | 4/2014 | Clerckx et al. |
| 8,774,152 | B2 | 7/2014 | Kim et al. |
| 8,837,625 | B2 | 9/2014 | Koo et al. |
| 8,861,628 | B2 | 10/2014 | Roh et al. |
| 9,154,200 | B2 | 10/2015 | Baker et al. |
| 9,178,658 | B2 | 11/2015 | Lee et al. |
| 9,237,561 | B2 | 1/2016 | Han et al. |
| 9,241,342 | B2 | 1/2016 | Lin et al. |
| 9,312,932 | B2 | 4/2016 | Sasaki et al. |
| 9,325,397 | B2 | 4/2016 | Jonsson et al. |
| 9,455,801 | B2 | 9/2016 | Ko et al. |
| 9,531,509 | B2 | 12/2016 | Jöngren et al. |
| 9,538,511 | B2 | 1/2017 | Han et al. |
| 2008/0225970 | A1 | 9/2008 | Kim et al. |
| 2009/0175293 | A1 | 7/2009 | Xia et al. |
| 2010/0238886 | A1* | 9/2010 | Sambhwani ............ H04L 1/04 370/329 |
| 2010/0272048 | A1* | 10/2010 | Pan ..................... H04L 1/1635 370/329 |
| 2013/0265980 | A1 | 10/2013 | Zhu et al. |
| 2014/0044028 | A1 | 2/2014 | Nammi et al. |
| 2014/0044060 | A1 | 2/2014 | Nammi et al. |
| 2014/0044206 | A1 | 2/2014 | Nammi et al. |
| 2014/0064392 | A1 | 3/2014 | Jonsson et al. |
| 2014/0133471 | A1 | 5/2014 | Nammi et al. |
| 2016/0065276 | A1 | 3/2016 | Zhang et al. |
| 2016/0365993 | A1 | 12/2016 | Chen et al. |

OTHER PUBLICATIONS

Dai, Linglong et al., "Non-orthogonal multiple access for 5G: solutions, challenges, opportunities, and future research trends.", 2015, 8 pages.

Gomez, Gerardo et al., "Radio-interface physical layer", 2009, 50 pages.

Kadam, et al., "Review of Study and Design of Coding and Interleaving in a MIMO-OFDM Communication System", 2014, 4 pages.

Ketonen, Johanna , "Equalization and Channel Estimation Algorithms and Implementations for Cellular MIMO-OFDM Downlink", 2012, 180 pages.

Li, Qinghua et al., "MIMO techniques in WiMAX and LTE: a feature overview", 2010, 7 pages.

Ohm, Michael, "SIC receiver in a mobile MIMO-OFDM system with optimization for HARQ operation", 2008, 5 pages.

* cited by examiner

100

200

300

400

500

SINGLE CODEWORD, MULTI-LAYER SERIAL INTERFERENCE CANCELLATION (SIC) FOR SPATIAL MULTIPLEXING

FIELD OF THE DISCLOSURE

The subject disclosure relates to Single Codeword, Multi-Layer Serial Interference Cancellation (SIC) for Spatial Multiplexing.

BACKGROUND

A class of advanced antenna techniques to improve spectral efficiency and thereby boost overall system capacity is generally referred to as Multiple Input Multiple Output (MIMO). The MIMO technique uses a commonly known notation (M×N) to represent MIMO configuration in terms of a number (M) of transmit antennas and a number (N) of receive antennas.

It is well known that multiple transmit and receive antennas can significantly increase the data carrying capacity of wireless systems. However, for such MIMO systems, an optimal Maximum-Likelihood or Maximum A posteriori Probability (ML/MAP) detection using exhaustive search is impossible to implement. This is because a MIMO detector's complexity increases exponentially with the number of transmit antennas or/and the number of bits per constellation point.

Several suboptimal detector structures have been proposed in literature for reducing the complexity of the MIMO detector. These can be classified into linear and nonlinear detectors. Linear detectors include zero-forcing and minimum mean-square error detectors, and the nonlinear receivers include decision feedback, nulling-cancelling and variants relying on serial or successive interference cancellation. These suboptimal detectors can be relatively easy to implement but their bit-error-rate performance and/or frame-error-rate performance is significantly inferior to that of an optimum MIMO detector.

In general, most of these sub-optimal detection techniques for cancelling multi antenna interference are proposed with/without channel coding and without utilizing the potential of Cyclic Redundancy Check (CRC). In a practical system such as 5G New Radio (NR), $3^{rd}$ Generation Partnership Protocol (3GPP) Long Term Evolution (LTE)/LTE-Advanced, High-Speed-Downlink-Packet-Access (HSDPA), etc. CRC bits are appended before a channel encoder at the transmitter and an error check is performed after a channel decoder of a receiver to determine whether a packet, e.g., a transport block or portion thereof, is received correctly or not.

BRIEF DESCRIPTION OF THE DRAWINGS

Reference will now be made to the accompanying drawings, which are not necessarily drawn to scale, and wherein.

DETAILED DESCRIPTION

Figure 1:
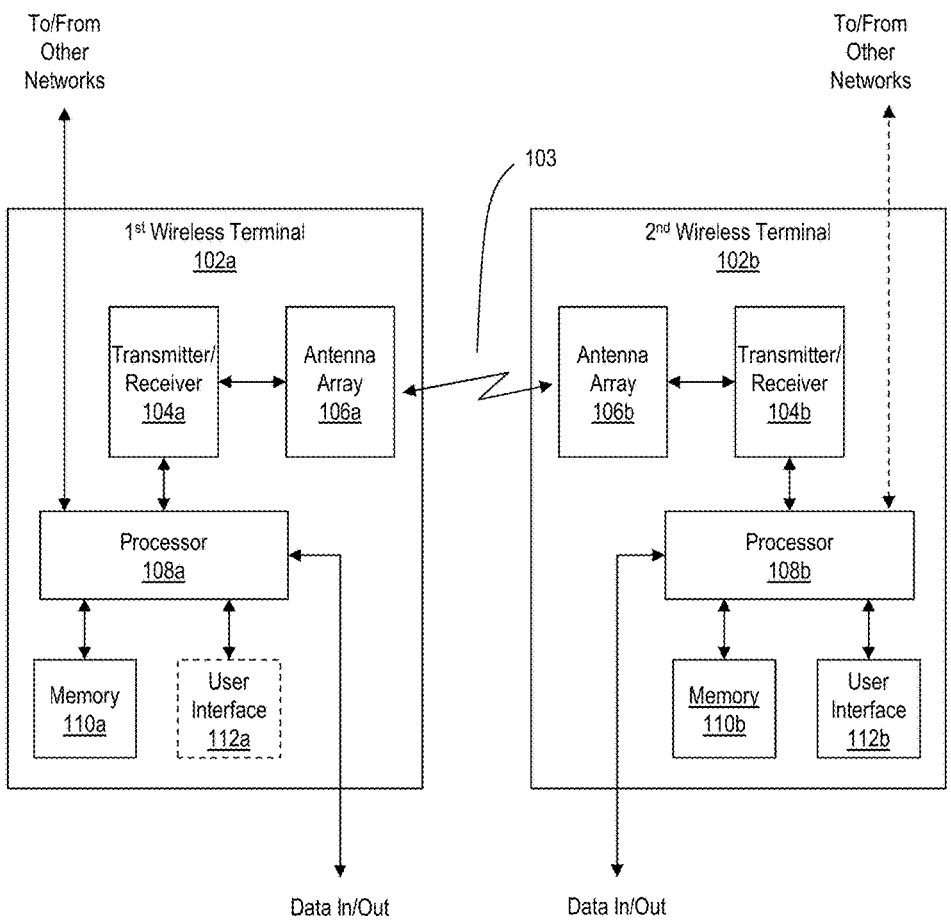
FIG. 1 depicts an illustrative embodiment of a pair of wireless communication systems.

The subject disclosure describes, among other things, illustrative embodiments for a multi-layer MIMO system that instead of using a single transport block with one error correction, e.g., CRC, for all the layers, uses multiple transport blocks, e.g., of equal size, but with the same HARQ process identifier across the layers. In at least some embodiments, multiple layers have respective transport block CRCs, allowing a MIMO receiver to use layers with error-free, or "passed" CRCs to reconstruct the bits and remove the interference from the received signal. Codeword, or Serial Interference Cancellation (SIC) can be implemented according to a single logical codeword based on channel-encoded codewords of the multiple layers, to obtain SIC gains when some of the layers are in "good" channel conditions, e.g., error-free, and some of the layers are "bad" channel conditions, e.g., detected errors, at the same time, while also reducing the feedback channel overhead. Other embodiments are described in the subject disclosure.

One or more aspects of the subject disclosure include a process that obtains a first number of transport data blocks, generates a first number of channel-encoded codewords based on the first number of transport data blocks, and generates a first logical codeword based on the first number of channel-encoded codewords. The first logical codeword is associated with one hybrid automatic-receive-request (HARQ) process identifier, wherein each of the first number of channel-encoded codewords, based on its association with the first logical codeword, is also associated with the one HARQ process identifier. The first logical codeword is mapped to a number of layers of a multiple-input-multiple-output (MIMO) spatial multiplexing system to obtain a logical codeword mapping. A MIMO signal is wirelessly transmitted to a receiver configured to perform MIMO detection of the MIMO signal and to obtain independent error detection results for each of the channel-encoded codewords of the first logical codeword. In response to detecting a negative acknowledgment (NAK) responsive to the independent error detection results identifying an error in one channel-encoded codeword of the first number of channel-encoded codewords of the first logical codeword, a modified first logical codeword is generated based on the one channel-encoded codeword of the first number of channel-encoded codewords. The modified first logical codeword is associated with the one HARQ process identifier, and the modified first logical codeword is mapped to the number of layers of the MIMO spatial multiplexing system for transmission to the receiver for further processing associated with the HARQ process identifier.

A device, having a processing system including a processor and a memory that stores executable instructions that, when executed by the processing system, facilitate performance of operations. The operations include generating a first number of channel-encoded codewords based on a first number of transport data blocks, and determining a first logical codeword based on the first number of channel-encoded codewords. The first logical codeword is associated with one hybrid automatic-receive-request (HARQ) process identifier, wherein each of the first number of channel-encoded codewords, based on its association with the first logical codeword, is also associated with the one HARQ process identifier. The first logical codeword is mapped to a number of layers of a multiple-input-multiple-output (MIMO) spatial multiplexing system to obtain a logical codeword mapping. A MIMO signal is wirelessly transmitted to a receiver configured to perform MIMO detection of the MIMO signal and to obtain independent error detection results for each of the channel-encoded codewords of the first logical codeword. In response to detecting an error responsive to the independent error detection results identifying an error in one channel-encoded codeword of the first number of channel-encoded codewords of the first logical codeword, determining a modified first logical codeword based on the one channel-encoded codeword of the first number of channel-encoded codewords. The modified first logical codeword is associated with the one HARQ process identifier, and the modified first logical codeword is mapped to the number of layers of the MIMO spatial multiplexing system for transmission to the receiver for further processing associated with the HARQ process identifier.

A machine-readable storage medium, including executable instructions that, when executed by a processing system including a processor, facilitate performance of operations. The operations include obtaining a first number of channel-encoded codewords based on a first number of transport data blocks, and identifying a first logical codeword based on the first number of channel-encoded codewords. The first logical codeword is associated with one hybrid automatic-receive-request (HARQ) process identifier, wherein each of the first number of channel-encoded codewords, based on its association with the first logical codeword, is also associated with the one HARQ process identifier. The first logical codeword is associated with a number of layers of a multiple-input-multiple-output (MIMO) spatial multiplexing system to obtain a logical codeword mapping. A MIMO signal is wirelessly transmitted to a receiver configured to perform MIMO detection of the MIMO signal and to obtain independent error detection results for each of the channel-encoded codewords of the first logical codeword. In response to detecting an error responsive to the independent error detection results identifying an error in one channel-encoded codeword of the first number of channel-encoded codewords of the first logical codeword, generating a modified first logical codeword based on the one channel-encoded codeword of the first number of channel-encoded codewords. The modified first logical codeword is associated with the one HARQ process identifier, and the modified first logical codeword is mapped to the number of layers of the MIMO spatial multiplexing system for transmission to the receiver for further processing associated with the HARQ process identifier.

According to some embodiments, a communications device can be operated to support MIMO reception over a wireless channel. First and second data blocks, e.g., transport blocks, can be received respectively using first and second reception layers during a first Transmission Time Interval (TTI) for rank two reception. A first Hybrid Automatic Repeat Request (HARQ) process can be mapped to the first transport block of the first reception layer for the first transmission time interval and also to the second transport block of the second reception layer for the first TTI. Third, fourth, and fifth transport blocks can be received respectively using the first and second reception layers and using a third reception layers during a second TTI for rank three reception. The first HARQ process can be mapped to the third transport block of the first reception layer for the second TTI and the first HARQ process can be mapped to the fourth and fifth transport blocks of the second and third reception layers for the second TTI. The process can be repeated in a like manner for applications having ranks greater than four.

Mapping the first HARQ process to the first and second transport blocks of the first TTI can include transmitting an acknowledgment (ACK) message to the radio access network responsive to successfully decoding both of the first and second transport blocks and transmitting a non-acknowledgment (NAK) message to the radio access network responsive to failure decoding one or more of the first and second transport blocks. Where more than two transport blocks are processed according to the first HARQ process, an ACK is provided when all transport blocks have been successfully decoded at the receiver, otherwise, a NAK is provided.

In at least some embodiments, a precoding vector can be selected responsive to success and/or failure decoding the multiple transport blocks, and an identification of the selected precoding vector can be transmitted to a radio access network.

The processor can be configured to transmit multiple transport blocks through a transceiver using multiple transmission layers during a first TTI. The number of layers can be determined according to a rank of the MIMO system, e.g., being less than or equal to the rank. A common HARQ process, e.g., identified by the same HARQ process identifier (ID), can be associated with each transport block of the multiple transport blocks of the multiple layers for the first TTI.

For purposes of illustration and explanation only, these and other embodiments of present inventive concepts are described herein in the context of operating in a RAN that communicates over radio communication channels with wireless terminals (also referred to as UEs). It will be understood, however, that present inventive concepts are not limited to such embodiments and can be embodied generally in any type of communication network. As used herein, a wireless terminal (also referred to as a UE) can include any device that receives data from a communication network, and can include, but is not limited to, a mobile telephone ("cellular" telephone), laptop/portable computer, pocket computer, hand-held computer, desktop computer, and more generally, any device capable of machine-to-machine communications, e.g., Internet of Things (IoT).

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controller is typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The 3GPP has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP LTE/LTE-Advanced is used in this disclosure to exemplify embodiments of inventive concepts, this should not be seen as limiting the scope of inventive concepts to only these systems. Other wireless systems, including fifth generation LTE, sometimes referred to as "5G", WCDMA (Wideband Code Division Multiple Access), WiMax (Worldwide Interoperability for Microwave Access), UMB (Ultra Mobile Broadband), HSDPA (High-Speed Downlink Packet Access), GSM (Global System for Mobile Communications), etc., can also benefit from exploiting embodiments of present inventive concepts disclosed herein.

Also note that terminology such as base station (also referred to as eNodeB or Evolved Node B) and wireless terminal (also referred to as UE or User Equipment) should be considering non-limiting and does not imply a certain hierarchical relation between the two. In general a base station (e.g., an "eNodeB") and a wireless terminal (e.g., a "UE") can be considered as examples of respective different communications devices that communicate with each other over a wireless radio channel. While embodiments discussed herein can focus on wireless transmissions in a downlink from an eNodeB to a UE, embodiments of inventive concepts can also be applied, for example, in the uplink.

FIG. 1 depicts an illustrative embodiment of a communication system 100 including a pair of wireless communication devices 102a, 102b in communication over wireless channel 103 according to some embodiments of the disclosure. As shown, the first wireless terminal 102a includes a first transceiver 104a coupled between a first processor 108a, a first antenna array 106a and a first memory 110a coupled to the processor 108a. In at least some embodiments, the first antenna array 106a includes multiple antennas. In some embodiments, the first wireless terminal 102a includes a first user interface 112a (shown in phantom).

The first wireless terminal processor 108a transmits first communications through the first transceiver 104a and the first antenna array 106a for reception at the second processor 108b through the second antenna array 106b and the first transceiver 104b. The first communications can include information of multiple, separately-encoded transport blocks of data mapped to different layers within a common TTI.

The second wireless communication device 102b can include a second transceiver 104b coupled between a second antenna array 106b and a second processor 108b. The second processor 108b is connected to a second user interface 112b and a second memory 110b. Accordingly, the first processor 108a, e.g., of a base station, can transmit communications through the first transceiver 104a and the first antenna array 106a for reception at the wireless terminal processor 108b through the second antenna array 106b and second transceiver 104b.

The second wireless terminal processor 108b transmits second communications through the second transceiver 108b and the second antenna array 106b for reception at the first processor 108a through the first antenna array 106a and the first transceiver 104a. Traditionally, the second first and/or second communications include information related to one or more of channel quality indicator(s), transport block size(s), modulation format, HARQ process number(s), redundancy versions, etc., such that the feedback channel overhead is proportional to the transmission rank. According to the techniques disclosed herein, there is no need for multiple HARQ process numbers as a single HARQ process number is applied to multiple channel-encoded codewords of the logical codeword. Moreover, in at least some embodiments, there is no need to discloses multiple block sizes, as a common transport block size is used for each of the multiple transport blocks of the single logical codeword.

To support a multi-branch MIMO, e.g., up to four or more branches allowing parallel transmission of four or more layers/streams of data using a same Time/Frequency Resource Element (TFRE), each of the first and second antenna arrays 106a and 106b can include four (or more) antenna elements. The second wireless terminal 102b, for example, can be a cellular radiotelephone, a smart phone, a laptop/netbook/tablet/handheld computer, or any other device providing wireless communications. The user interface 112b, for example, can include a visual display such as a liquid crystal display, a touch sensitive visual display, a keypad, a speaker, a microphone, etc.

For MIMO downlink transmissions from the first wireless terminal 102a, e.g., a radio access node, to the second wireless terminal 102b, a codebook of precoding vectors, e.g., known at both the RAN 102a and the wireless terminal 102b, is used to precode, e.g., to apply precoding weights to, the different data layers, e.g., data streams, that are transmitted in parallel from a sector antenna array(s) to the wireless terminal 102b during a same TFRE, and to decode the data layers (data streams) received in parallel during the same TFRE at the second wireless terminal 102b. The same codebook of precoding vectors can be stored in the first and second memories 110a, 110b. Moreover, the second wireless terminal 102b can estimate characteristics of each downlink channel to generate channel quality information (CQI), and CQI feedback from the second wireless terminal 102b can be transmitted to the base station 102a. This CQI feedback can then be used by the base station processor 108a to select one or more of: transmission rank, i.e., a number of data layers/streams to be transmitted during a subsequent TFRE; transport data block length(s); channel code rate(s) to be used to channel encode different transport data blocks; modulation order(s); symbol to layer mapping schemes; and/or precoding vectors for respective downlink transmissions to the wireless terminal 102b.

By way of example, the base station antenna array 106a can include four antennas and the wireless terminal antenna array 106b can include four antennas so that the wireless terminal 102b can receive up to four downlink data layers (data streams) from the base station antenna array 106a during MIMO communications. In this example, the precoding codebook can include rank-one precoding vectors (used when transmitting one downlink data stream from the base station sector antenna array 106a to the wireless terminal 102b), rank-two precoding vectors (used when transmitting two downlink data streams from the base station sector antenna array 106*a* to the wireless terminal 102*b*), rank-three precoding vectors (used when transmitting three downlink data streams from the base station sector antenna array 106*a* to the wireless terminal 102*b*), and rank-four precoding vectors (used when transmitting four downlink data streams from the base station sector antenna array 106*a* to the wireless terminal 102*b*), and so on for higher rank applications. Precoding vectors can also be referred to, for example, as precoding codebook entries, precoding codewords, and/or precoding matrices.

An issue for four-layer MIMO transmission techniques for HSDPA is what number of HARQ codewords/processes should be supported. To reduce uplink and/or downlink signaling, a single HARQ codeword/process can be used in four layer MIMO transmission schemes for feedback relating to one, two, three, and four layer downlink transmissions. Use of a single HARQ codeword/process can be relatively easy to implement without significantly reducing performance (relative to use of multiple, e.g., two or four HARQ codewords/processes). HARQ process(es) can be used in a wireless system to overcome transmission errors that cannot be corrected using a forward error correction code (also referred to as a channel code) alone. In some embodiments of a HARQ process, the HARQ process is mapped to one or more transmission layers, and the transmitting device (e.g., at the base station 102*a*) attaches an error detection/correction code (e.g., a cyclic redundancy check or CRC code) to each transport data block (also referred to as a data block, data packet, packet, etc.) of a TTI/TFRE to provide error detection/correction, and the resulting data block including the error detection/correction code can be referred to as a data or error-correction codeword. At the receiving device (e.g., at the wireless terminal 102*b*), the contents of each received transport data block can be validated using the respective error detection/correction code attached thereto. If the transport data block fails the error detection/correction validation, the receiving device can send an HARQ codeword including a negative acknowledgement NAK message (also referred to as a non-acknowledgement message) for the HARQ process back to the transmitting device to request a retransmission of the failed transport data block or blocks mapped to the HARQ process. A failed data block can be retransmitted until it is either decoded or until a maximum number of allowed retransmissions (e.g., four to six retransmissions) have occurred. If the transport data block passes the error detection/correction validation, a HARQ codeword including an acknowledgement ACK message for the HARQ process is sent back to the transmitting device to acknowledge reception and correct decoding of the transport data block. A HARQ process can thus be mapped to one or more MIMO transmission layers, and for each TTI/TFRE, the HARQ process can generate a HARQ ACK/NAK feedback message that is transmitted in a HARQ codeword of the feedback channel.

As discussed in greater detail below, a second wireless terminal 102*b* implementing HARQ functionality can include a soft buffer for each transport data block received during a TFRE so that originally transmitted and retransmitted transport data blocks can be combined before decoding to thereby improve system throughput. Depending on the way the originally transmitted and retransmitted transport data blocks are combined, HARQ systems/processes can be classified as chase combining or (retransmitting the same transport data block without additional information) or Incremental Redundancy or IR (transmitting the same transport data block with additional parity bits).

In some embodiments, a single soft buffer can be used for layer/rank one MIMO transmission/reception (with one transport data block received during a TFRE), two soft buffers can be used for layer/rank two MIMO transmission/reception (with two transport data blocks received during a TFRE), and so on for higher rank applications. Alternatively or in addition, a single soft buffer can be used for rank two or higher MIMO transmission/reception, with multiple transport data blocks received during a TFRE. Each of the one or more soft buffers stores a demodulator output for a transport data block before decoding to be used after a retransmission if the transport data block is not successfully decoded. For 3GPP, Release 7, MIMO supporting up to two rank/layer transmissions (with up to two transport data blocks transmitted to a UE during a TFRE), a HARQ process is provided for each soft buffer and thus for each transport data block.

According to some embodiments discussed herein, methods can be provided to map functionalities between base station 102*a* transmission layers, wireless terminal 102*b* receiver layers (including respective soft buffers), and HARQ processes for situations when the number of supported HARQ processes is less than a number of MIMO transmission layers/ranks supported by the system (e.g., when rank/layer 3 and/or 4 MIMO transmissions are supported but only two HARQ processes are supported). With two HARQ processes, both HARQ ACK/NAK messages can be included in a HARQ codeword of the feedback channel.

Figure 2:
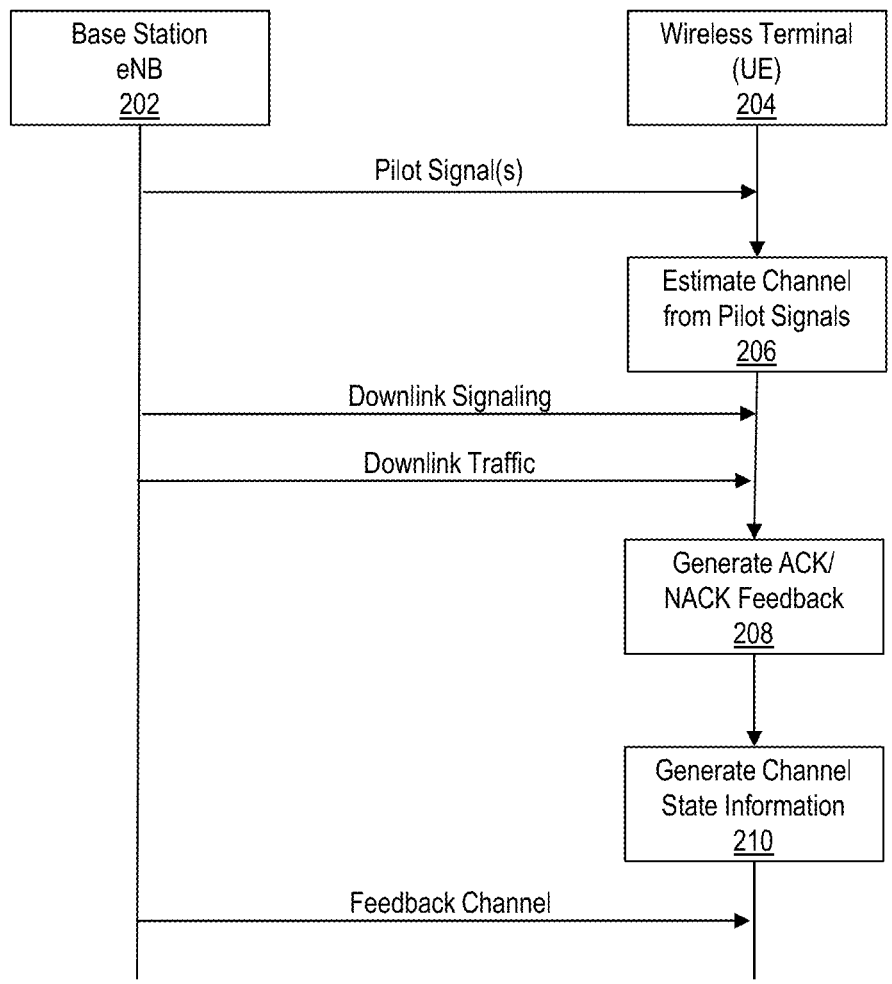
FIG. 2 depicts an illustrative embodiment of is a message sequence chart for a MIMO communication system.

FIG. 2 depicts an illustrative embodiment of an example message sequence 200 for a MIMO communication system. The example message sequence 200 is between a base station 202 and a wireless terminal 204 in a MIMO communications system. In the illustrative embodiment, the base station 202 transmits pilot signal(s) over one or more downlink channel(s). The wireless terminal 204 estimates the downlink channel(s) at block 206 (for transmissions from the base station 102*a* to the wireless terminal 102*b*) based on the pilot signals. In at least some embodiments, the base station 200 transmits downlink signaling to identify a rank and/or a precoding vector to be used for subsequent downlink traffic. Downlink traffic can be transmitted by base station 202 in accordance with the downlink signaling.

In at least some embodiments, the wireless terminal 204 generates ACK/NAK feedback at block 208, e.g., to be provided in a HARQ codeword, and/or channel state information for the downlink channel at block 210. The wireless terminal 204 can report the channel state information and the ACK/NAK feedback to the base station 202 over a feedback channel More particularly, the channel state information can include one or more of a recommended precoding vector, e.g., identified using a precoding index, and rank, e.g., identified using a rank indicator, determined responsive to the channel estimate, e.g., based on the pilot signals, and responsive to the ACK/NAK feedback. The wireless terminal 204 can determine the success (or lack thereof) of receiving downlink traffic during a downlink Time/Frequency Resource Element (TFRE) (as indicated by the ACK/NAK feedback) in the determination of the recommended precoding vector. A feedback channel report can include a HARQ element/message/codeword (including acknowledge/ACK and/or negative-acknowledge/NAK information) and/or CQI/PCI (channel quality information and/or precoding index) information.

Figure 3:
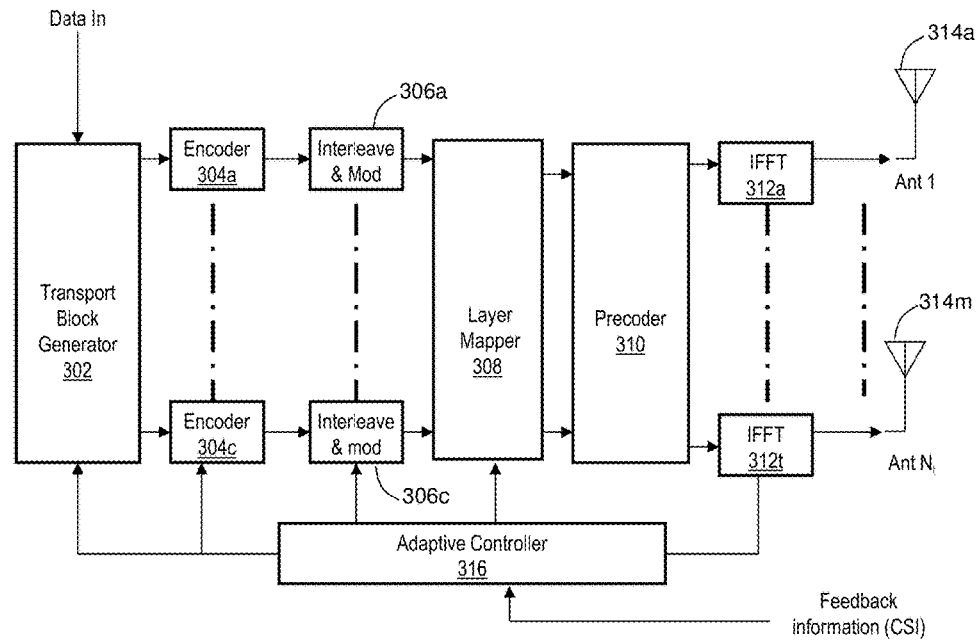
FIG. 3 depicts an illustrative embodiment of a MIMO transmit processor.

FIG. 3 depicts a block diagram illustrating elements/functionalities of a transmit portion of a wireless terminal processor, e.g., a base station processor 108*a* (FIG. 1), supporting an HARQ process/codeword MIMO with a number "c" of channel encoders 304a ... 304c, generally 304) and up to rank "c" MIMO downlink transmission according to some embodiments. In at least some embodiments, a rank "c" can be an integer number that is less than or equal to a minimum of the number of transmit antennas "Nt" and the number of receive antenna "Nr". Namely, c</=Minimum (Nt, Nr).

The channel encoders 304 can provide for up to "c" streams of transport data blocks TB1, TB2 ... TBc, with symbols of one data input stream for the wireless terminal 102a being mapped to as many as "c" different data streams. As shown, the processor 108a can include a transport data block generator 302, a number of channel encoders 304, a number of modulators 306a ... 306c, generally 306, a layer mapper 308 and a layer precoder 310. The transport block generator 302 can include a number of individual transport block generators, e.g., a number "c" transport block generators, TB1, TB2 ... TBc, each processing a respective transport block. In at least some embodiments, the processor 108a can include one or more spreader/scramblers, e.g., one for each antenna output of the precoder 310.

In at least some embodiments, the modulators 306 include interleavers, e.g., referred to as interleaver/modulators. The layer mapper 308 can be configured to map resulting symbols of the "c" streams to as many as "c" different MIMO layers (streams) X1 ... Xc as discussed in greater detail below. The processor 108a can include an adaptive controller 316 that can be configured to control one or more of the transport data block generator 302, the channel encoder 304, the modulator 306, the layer mapper 308, and/or the layer precoder 310. In more detail, such control by the adaptive controller 316 can be responsive to Channel Quality Information (CQI) received as feedback from wireless terminal 204. Accordingly, symbols generated responsive to one or more data codewords generated by the channel encoders 304 using different channel coding (determined by adaptive controller 316 responsive to the wireless terminal 204 feedback) can be interleaved and distributed (mapped) to "c" different MIMO layers. A data codeword CW generally refers to a transport data block with additional channel coding and/or parity and/or CRC bits.

As disclosed herein, the concept of a codeword is generalized to include a logical codeword that corresponds to more than one transport data blocks, each having channel coding applied, respectively, and/or parity and/or CRC bits. The resulting channel encoded blocks or words with parity and/or CRC bits can be treated as a single logical codeword, with respect to the same HARQ process ID.

The data codeword, e.g., the single logical codeword, can be interleaved and/or then split between different MIMO layers. According to some embodiments discussed herein, the layer mapper 308 can perform a one-to-one mapping.

The base station processor 108a, for example, can receive input data, e.g., from a mobility core network, from another base station, and the like, for transmission to a wireless terminal 102b, and the transport data block generator 302 (including transport data block data generators TB1, TB2, ... TBc) can provide a single stream of data blocks (for rank 1 transmissions) or separate the input data into a number of different streams of data blocks, e.g., for rank 2, rank 3, and so on.

For rank 2 transmissions (providing 2 MIMO layers/streams), the transport data block generator 302 can generate a first layer/stream of transport data blocks (including individual transport data blocks), and a second layer/stream of transport data blocks. For higher order ranks, the transport data block generator 302 generates additional layers/streams/of transport data blocks.

The channel encoders 304 can encode the respective stream/streams of data blocks generated by the transport data block generator 302 to provide respective streams of channel-encoded codewords, for example, using turbo coding, convolutional coding, etc. Moreover, in at least some embodiments, coding characteristics (e.g., coding rates) applied by the individual channel encoders 304 can be separately determined by the adaptive controller 316, responsive to feedback from the wireless terminal 102b (e.g., CQI regarding the downlink channel). For rank two transmissions, the channel encoder 403 can generate two streams of channel-encoded codewords responsive to respective streams of transport blocks using two of the channel encoders 304. Additional channel encoders 304 can be applied in a like manner to accommodate higher-order ranks including data to be transmitted during a same TFRE.

The interleaver/modulators 306 can interleave and/or modulate the stream/streams of channel encoded codewords generated by the channel encoders 304 to provide respective streams of unmapped channel-encoded symbol blocks. For rank two transmissions, the interleaver/modulators 306 can generate two streams of unmapped symbol blocks responsive to respective streams of channel-encoded codewords, and so on for higher-order ranks. The interleaver/modulators 306 can apply modulation orders responsive to or otherwise based on input from the adaptive controller 316, e.g., determined based on CQI feedback from the wireless terminal 102b.

In addition, each interleaver/modulator 304 can interleave data of two or more data codewords of a stream so that two or more consecutive unmapped symbol blocks of a respective stream include symbols representing data of the two or more consecutive channel-encoded codewords. For example, data of consecutive channel-encoded codewords of a first channel-encoded codeword stream can be interleaved and modulated to provide consecutive unmapped symbol blocks of a first stream of symbols. Similarly, data of consecutive channel-encoded codewords of the second channel-encoded codeword stream can be interleaved and modulated to provide consecutive unmapped symbol blocks of the second stream of symbols. Likewise, data of consecutive channel-encoded codewords of a third channel-encoded codeword stream can be interleaved and modulated to provide consecutive unmapped symbol blocks of a third symbol stream, and so on for higher order ranks.

In at least some embodiments, symbols of streams of unmapped symbol blocks can be treated as symbols of a single logical code word, LCW. The single logical codeword can be mapped to one or more streams of mapped symbol blocks X1, X2 ... Xc (for respective MIMO transmission layers), for example, using a one-to-one mapping. While one-to-one mapping is discussed by way of example, other mappings can be used provided that the mapping function of the layer mapper 302 is known to both base station 102a and wireless terminal 102b.

In at least some embodiments, the processor 300 includes a spreader/scrambler, e.g., including a separate spreader/scrambler for each mapped symbol stream provided by the layer mapper 308. The spreader/scrambler can generate a respective stream of spread symbol blocks Y1, Y2 ... Yc, e.g., using a Walsh code, or the like. The precoder 310 can apply a MIMO precoding vector, e.g., by applying precoding weights, of the appropriate rank. In at least some embodiments, the precoding is based on wireless terminal feedback as interpreted by the adaptive controller 316. The precoding can be applied to the streams of spread symbol blocks for transmission through a transmitter/receiver or transceiver 104a (FIG. 1) and antennas 314a, 314b . . . 314Nt, generally 314, of the antenna array 106a (FIG. 1).

The base station processor 102a can support a single HARQ process MIMO with up to "c" channel encoders 304 generating respective channel-encoded codewords CW1'-CWc'. Using feedback from the wireless terminal 102b (indicated by "feedback information (CSI)"), the adaptive controller 316 can choose one or more of a transport block length, a modulation order, and/or a coding rate, e.g., used by the transport block generator 302, the encoder 304, and/or the interleaver/modulator 306). The adaptive controller 316 can also generate precoding weight information used by the layer precoder 310. Even though the encoder 304 includes up to "c" channel encoders, the wireless terminal 102b can only provide feedback information for a maximum of one encoded logical codeword, based on up to "c" transport block channel-encoded codewords. Stated in other words, the wireless terminal 102b can provide one HARQ process (HARQ-1a) for rank one transmissions (with one transport data block per TFRE using one downlink data stream), the wireless terminal 102b can provide one HARQ processes (HARQ-1b) for rank two transmissions (with one logical codeword per TFRE based on two channel-encoded transport data blocks using two downlink data streams), the wireless terminal 102b can provide one HARQ processes (HARQ-1c) for rank three transmissions (with one logical codeword per TFRE based on three transport data blocks per TFRE using three downlink data streams), and so on for higher-order ranks.

For rank two or higher transmissions, a number of data streams generated by the transport block generator 302, the encoder 304, the interleaver/modulators 306, and the spreader scrambler (not shown) is greater than a number of HARQ processes supported by the base station 102a and/or wireless terminal 102b. According to embodiments of present inventive concepts, a HARQ process can be mapped to more than one data stream for rank two through rank "c" transmissions (also referred to as bundling). For rank one transmissions, a first HARQ process (HARQ-1) can be mapped directly to a first data stream/layer (e.g., transmitted using a first transmission layer and received using a first reception layer). For rank two transmission, the first HARQ process (HARQ-1) can be mapped to a second data stream (e.g., transmitted using a second transmission layer and received using a second reception layer), and so on for higher ranks. An example mapping of HARQ processes to reception layers is provided below in Table 1, for rank 1 to rank "c" configurations.

TABLE 1

Mapping HARQ to reception Layers

| Rank | Layer (Stream) | HARQ Process |
|---|---|---|
| 1 | Layer 1 (CW1') | HARQ-1 |
| 2 | Layer 1 (CW1') | HARQ-1 |
|   | Layer 2 (CW2') | HARQ-1 |
| 3 | Layer 1 (CW1') | HARQ-1 |
|   | Layer 2 (CW2') | HARQ-1 |
|   | Layer 3 (CW3') | HARQ-1 |
| . . . | . . . | . . . |
| "c" | Layer 1 (CW1') | HARQ-1 |
|   | Layer 2 (CW2') | HARQ-1 |
|   | Layer 3 (CW3') | HARQ-1 |
|   | . . . | . . . |
|   | Layer "c" (CWc') | HARQ-1 |

At the wireless terminal 102b (FIG. 1), operations of the processor 108b can mirror operations of the base station processor 108a when receiving the MIMO downlink communications transmitted by the base station 102a. More particularly, elements/functionalities of the wireless terminal processor 108b are illustrated in the example processor 400 of FIG. 4, e.g., mirroring elements/functionalities of the base station processor 300 discussed above with reference to FIG. 3.

Figure 4:
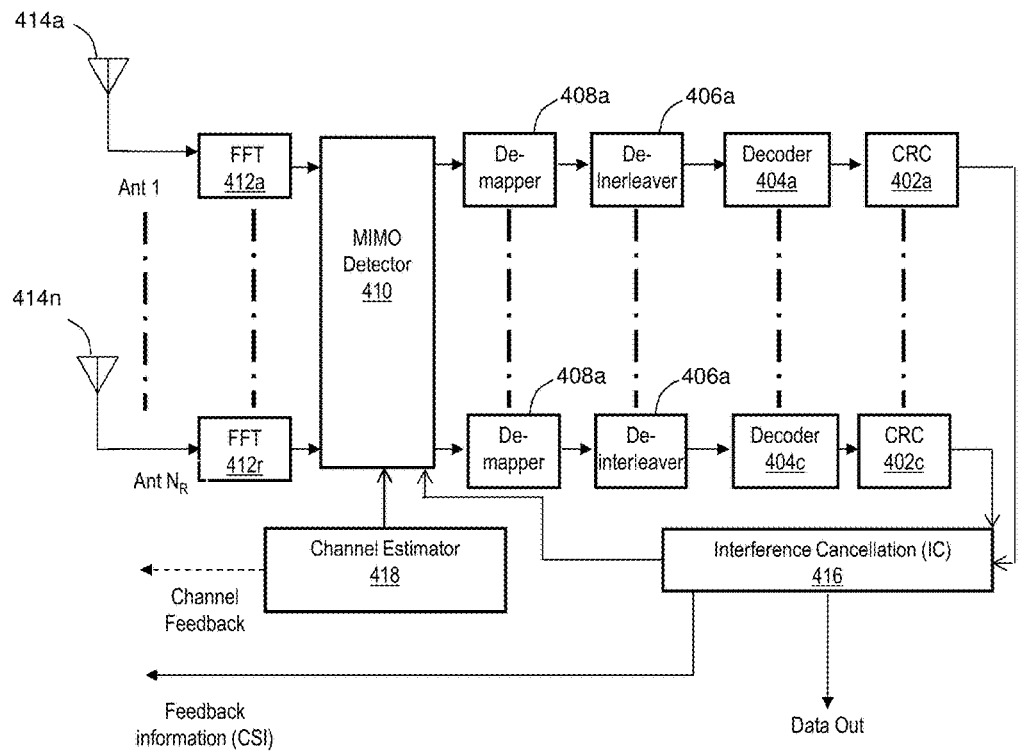
FIG. 4 depicts an illustrative embodiment of a MIMO receive processor.

In reference to FIG. 4, the radio signals can be received through MIMO antenna elements 414a . . . 414n, generally 414, of a MIMO antenna array 106b and transceiver 104b (FIG. 1). The processor 400 can include one or more FFT processors 412a . . . 412n, generally 412, e.g., one for each antenna element 414. The processor 400 can include a MIMO detector 410 in communication between the FFT processors 412 and one or more de-mappers 408a . . . 408c, generally 408. The processor 400 can further include one or more de-interleavers 406a . . . 406c, generally 406, one or more layer decoders 404a . . . 404c, generally 404, and one or more CRC processors 420a . . . 402c, generally 402. The de-interleaver(s) 406 are in communication between the de-mappers 408 and the layer decoders 404, and the decoders 404 are in further communication between the de-interleavers 406 and the CRC processors 402.

The radio signals can be decoded by the layer decoders 404, using a MIMO decoding vector to generate a number of MIMO decoded symbol layers X1', X2', X3', and/or Xc' depending on a MIMO rank used for transmission/reception. The layer decoders 404 can use a decoding vector corresponding to the precoding vector used by the base station 102a. The layer decoders 404 can generate a single decoded symbol layer X1' for rank 1 reception, two decoded symbol layers X1' and X2' for rank 2 reception, and so on for higher-order rank transmissions. The layer decoder 404 can thus perform a converse of operations performed by the layer precoder 310 (FIG. 3) and spreader/scrambler, when used, of the base station 102a. The layer decoder 404 can perform functionalities of a MIMO detector (corresponding to a converse of layer precoder 310) and of dispreading/descrambling blocks for each data stream/layer (corresponding to a converse of spreader/scrambler). Layer de-mappers 408a . . . 408c, generally 08, can function as a converse of the layer mapper 308 (FIG. 3) to de-map decoded symbol layers X1', X2' . . . and/or Xc' to respective unmapped symbol layers D1', D2' . . . and/or Dc' according to the transmission rank.

The For rank one reception, the layer de-mapper 408 can de-map symbols of decoded symbol layer X1' blocks directly to symbols of unmapped symbol layer D1' blocks, demodulator/de-interleaver DM-1 can demodulate/de-interleave unmapped symbol layer blocks to provide data codewords of data codeword stream CW1', and channel decoder CD1 can decode data codewords of data codeword stream CW1' to provide transport blocks of stream B1'. Transport block generator 607 can then pass transport blocks of stream B1' as a data stream. During rank one reception, demodulators/de-interleavers DM2, DM3, and DM4 and channel decoders CD2, CD3, and CD4 can be unused.

Figure 5:
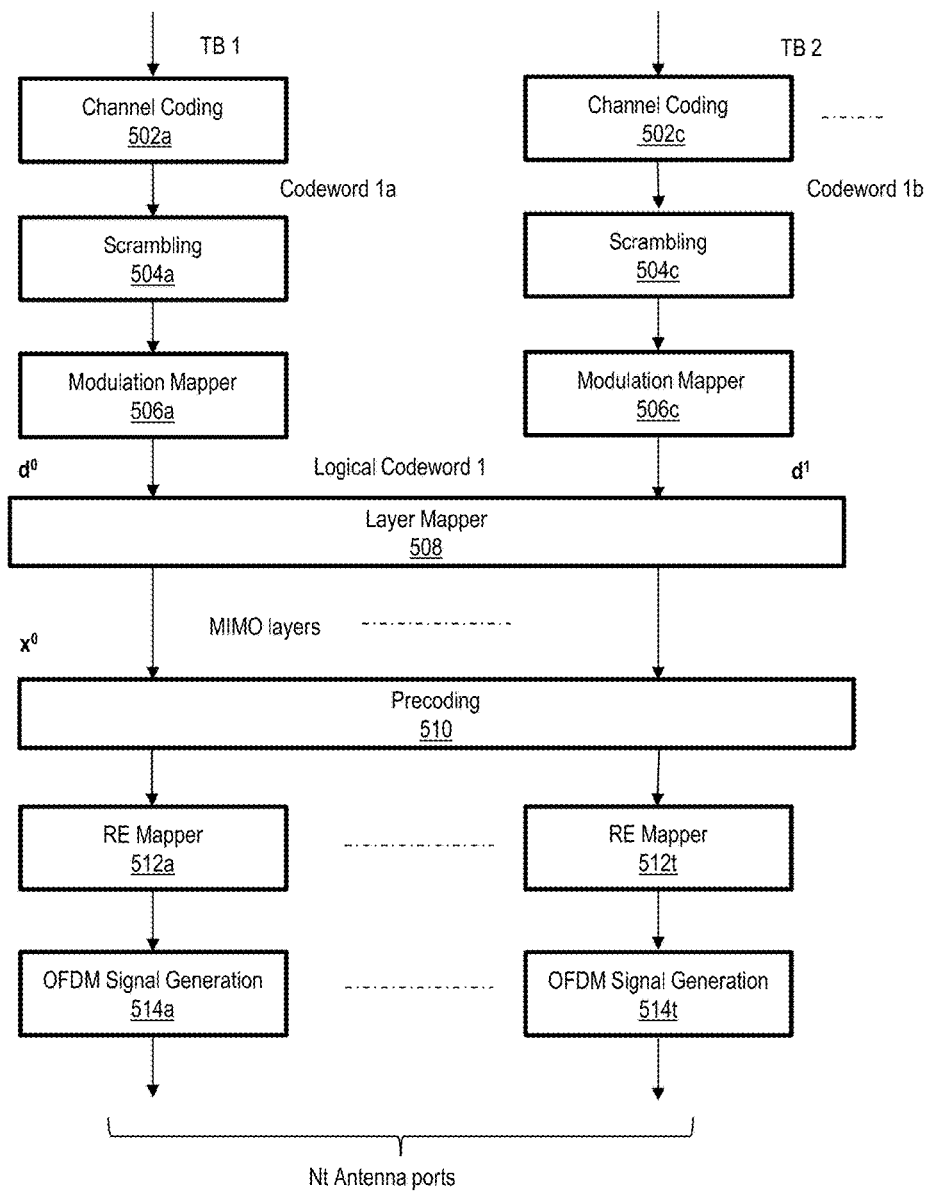
FIG. 5 depicts an illustrative embodiment of processing steps of the systems described in FIGS. 1-3.

FIG. 5 depicts an illustrative embodiment of processing steps 500 of the MIMO transmitter of FIG. 3. A first transport block TB1 is subjected to a first channel code at 502a to produce a first channel-encoded codeword, codeword 1a. Likewise, a second transport block TB2 is subjected to a second channel code at 502b to produce a second channel-encoded codeword, codeword 1b. In at least some embodiments, each of the individual channel-encoded codewords is respectively scrambled at 504*a*, 504*b*. Each of the scrambled codewords is mapped to respective modulation symbols at 506*a*, 506*b*. Although the illustrative example includes two transport blocks resulting in two channel-encoded codewords, the process can scaled in a like manner to accommodate more than two transport blocks, each resulting in a respective channel-encoded codeword that can be scrambled and mapped to respective modulation symbols in a like manner.

The modulation symbols of the respective channel-encoded codewords can be mapped to layers of a MIMO system by a layer mapper 508, resulting in multiple MIMO layers or streams. The number of MIMO layers available to the process can be based on factors, such as a number of antennas, according to traditional MIMO techniques. Precoding can be applied at 510, according to traditional MIMO techniques to support a number of available transmit antennas, Nt. For each antenna port, the precoded symbols are mapped to resource elements at 512*a* . . . 512*t*, generally 512, e.g., time/frequency resource elements, to provide increased reliability of reception at the wireless terminal due to transmit diversity gain. Orthogonal Frequency-Division Multiplexing (OFDM) is applied to each of the antenna ports at 514*a* . . . 514*t*, generally 514, for transmission over the Nt antennas.

The proposed structure uses multiple transport blocks associated with the same HARQ process identifier across the layers, instead of using a single transport block with one CRC for all the layers. The illustrative solution allows multiple layers have transport block error correction, e.g. CRC, allowing a receiver to identify and use any layers received successfully, e.g., with passed CRCs, while identifying other layer(s) has not having been received successfully, e.g., according to a NAK. Overhead is reduced, as the overhead can treat the multiple codewords as a single logical codeword having a single HARQ ID.

To the extent that errors are detected in one or more blocks, the logical codeword, having the same length, can be retransmitted responsive to the NAK and again having the same HARQ ID. Accordingly, the receiver can reconstruct the bits received without error and remove the interference from the received signal. Thereby applying the codeword SIC with single codeword. There by achieving SIC gains, when some of the layers are in good channel conditions and some of the layers are bad channel conditions at the same time reducing the feedback channel overhead.

TABLE 2

Initial Mapping HARQ to reception Layers for rank "c".

| Rank | Layer (Stream) | HARQ Process |
|---|---|---|
| "c" | Layer 1 (CW1a) | HARQ-1 |
|  | Layer 2 (CW1b) | HARQ-1 |
|  | . . . | . . . |
|  | Layer 3 (CW1c) | HARQ-1 |

Upon detection in the example rank "c" configuration, e.g., according to CRC results, it is determined that an error was experienced in Layer 2. Namely, CRC results can be obtained separately for each of the respective layers, according to the respective channel-encoded codewords for each layer. Consider a situation in which a receiver processor determines that Layer 1 and Layers 3-c are received without errors, or are at least correctable according to the applied channel coding, based on successful CRC results for these layers. However, consider that unsuccessful CRC results are obtained for Layer 2.

Figure 6:
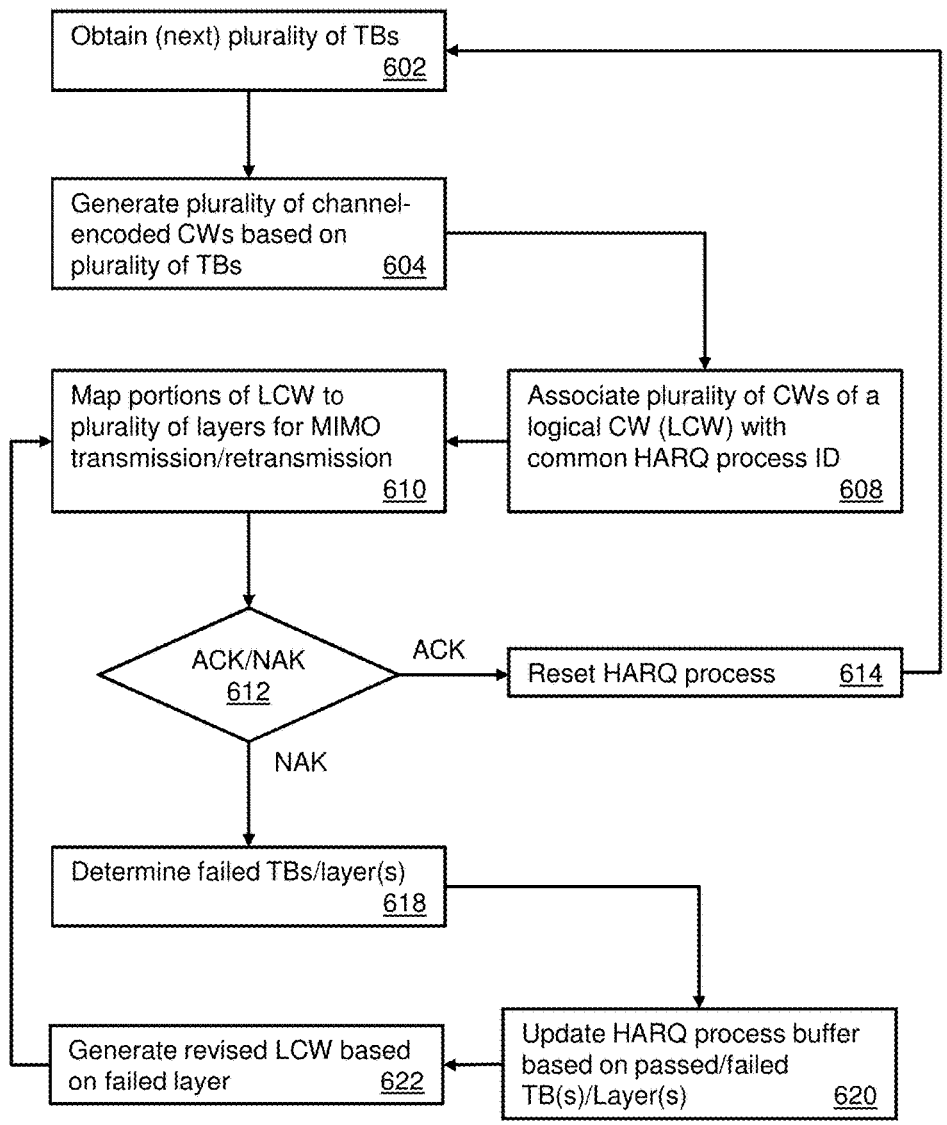
FIG. 6 depicts an illustrative embodiment of processing steps of a MIMO transmit processor of the systems described in FIGS. 1-3.

FIG. 6 depicts an illustrative embodiment of a process 600 used in portions of the system described in FIGS. 1-5. Input data destined for transport from a transmitter 102*a* (FIG. 1) to a receiver 102*b* over a MIMO system is first configured according to a group of transport blocks. A first set of transport blocks of the group can be transported during a common transport interval. The process can be repeated to determine a second set of transport blocks of the group transported during another common transport interval, and so on, until all of the input date has been transported to the receiver. The transport blocks are obtained for processing and transport at 602.

The number of transport blocks can be predetermined and/or determined according to the process, e.g., responsive to one or more other factors, such as channel conditions, error rates, data priority, transport delays, subscribed levels of service, and the like. It is understood that in at least some embodiments, the number of transport blocks can be changed, e.g., according to user and/or operator preference or selection, or otherwise adaptive to one or more of selections and/or system and/or channel conditions.

More than one channel-encoded codewords are determined at 604, based on the first group of transport blocks. In some embodiments, the number of channel-encoded codewords corresponds to the number of transport blocks of the group. Alternatively or in addition, one or more of the channel-encoded codewords can be based on more than one transport block. The channel-encoded codewords are determined according to any of the various channel encoding techniques disclosed herein or otherwise generally known. In at least some embodiments, the transport blocks and/or the channel-encoded codewords are processed to include error detection. Error detection processing can include any of the various techniques disclosed herein or otherwise generally known.

A concept of a logical CW (LCW) can be used to represent a grouping of the multiple channel-encoded codewords. For example, the multiple channel-encoded codewords can be associated with a common HARQ process ID at 608, and mapped to a plurality of layers of a MIMO system at 610. To the extent that a receiver detects errors with any of the transport blocks, e.g., according to the respective channel encoding and/or error detection, the logical codeword having an equivalent size to accommodate all of the channel-encoded codewords is re-generated for subsequent transport to the receiver. As disclosed herein, a resend of the logical codeword for the original group of transport blocks can be identical to the originally sent version, or some modification of the same. Modifications can include, without limitation, the same channel-encoded codewords of the transport blocks according to a different ordering and/or different layering association. Alternatively or in addition, modifications can include sending a predetermined set of bits for any portions of the logical codeword, e.g., any transport blocks of the first group, that were received without error. This can be applied according to the original ordering/association of layer mapping, or according to a different ordering/layering.

In at least some embodiments, a logical codeword generated responsive to a NAK, includes a redundant portion based on the one or more transport blocks received in error. For example, portions of the logical codeword associated with transport blocks received without error can be used to contain redundant copy of the transport block(s) received with error. Such redundant stacking of the logical codeword can facilitate error correction by leveraging spatial diversity of the MIMO system, particularly in a presence of fading channels.

The receiver 102(b) processes received MIMO signals as disclosed herein according a process that can mirror at least some of the processing applied at the transmitter 102(a). For example, the received MIMO signals are demodulated and detected according to a MIMO process, mapped to respective MIMO layers, de-interleaved, decoded and error checked. Since each of the transmitted layers has its own channel encoding and error detection, the receiver can detect errors on a per-layer basis.

To the extent that an ACK is detected at 612, the transmitter can determine that that the first group of transport blocks were received without error. The receiver can send the ACK to the transmitter signifying that all of the transport blocks of the first group have been successfully received. In response, a HARQ process identified by an HARQ ID and associated with the first group of transport blocks can be reset at 614. The reset can include clearing and/or relinquishing of any buffers used in association with the first HARQ process ID, such that the same resources can be available to process subsequent HARQ processes associated with subsequent groupings of transport blocks of the input data. The process can continue from 602 for subsequent groups of transport blocks of the input data. It is understood that any HARQ resources can be cleared and/or otherwise relinquished in response to a determination that transport of the input data has been completed.

To the extent that an NAK is detected at 612, the receiver concludes that the first group of transport blocks have not been received without error. The receiver can provide the NAK to the transmitter at 616, based on at least some of the transport blocks of the first group have not been successfully received.

In at least some embodiments, responsive to the NAK, one or more of the error-free layers and/or layers with errors are identified at 618. This can be accomplished by an indication by the receiver having determining a particular layer or layers in which errors were detected, a layer or layers in which errors were not detected, or a combination of both. In at least some embodiments, the HARQ process buffer(s) at the receiver is/are updated based on the passed and/or failed transport blocks or layer(s) at 620. This processing can include, without limitation, reconstructing the bits of the logical codeword, e.g., the combination of the individual channel-encoded codewords, and/or removing the interference from the received signal. Such incremental processing applies codeword interference cancellation also called serial interference cancellation based on the single logical codeword.

A revised logical codeword having the same HARQ ID is generated at 622. The revised logical codeword can be identical to a previously transmitted logical codeword of the same HARQ ID. Alternatively or in addition, the revised logical codeword can be modified to include, without limitation, the same channel-encoded codewords of the transport blocks according to a different ordering and/or different layering association. Alternatively or in addition, modifications can include sending a predetermined set of bits for any portions of the logical codeword, e.g., any transport blocks of the first group, that were received without error. This can be applied according to the original ordering/association of layer mapping, or according to a different ordering/layering.

The modified logical codeword is mapped to the multiple layers of the MIMO system at 610, and the process repeats from there. To the extent an ACK is determined at 612, the HARQ process is reset at 614 and processing moves on to subsequent groups of transport blocks. To the extent that a NAK is determined at 612, the process continues until the failures are eliminated and/or until a predetermined number of re-sends have been attempted. Upon an ultimate determination that an error free version of the group of transport blocks was unattainable, an error can be logged and/or otherwise shared with a controller, service provider, user, and the like. Alternatively or in addition, processing of the failed group of transport blocks can be retried at a later time, e.g., under different channel fading conditions, and/or at higher layers of system processing.

It is understood that in response to such failures, a grouping of the transport blocks can be changed. For example, a transport block size can be changed either increasing and/or decreasing a size of the transport blocks of a particular group associated with a common HARQ ID, and the process 600 repeated under the modified configuration. Alternatively or in addition, a ratio of channel-encoded codeword (transport block) to layer mapping can be modified and the process 600 repeated under the modified configuration.

Figure 7:
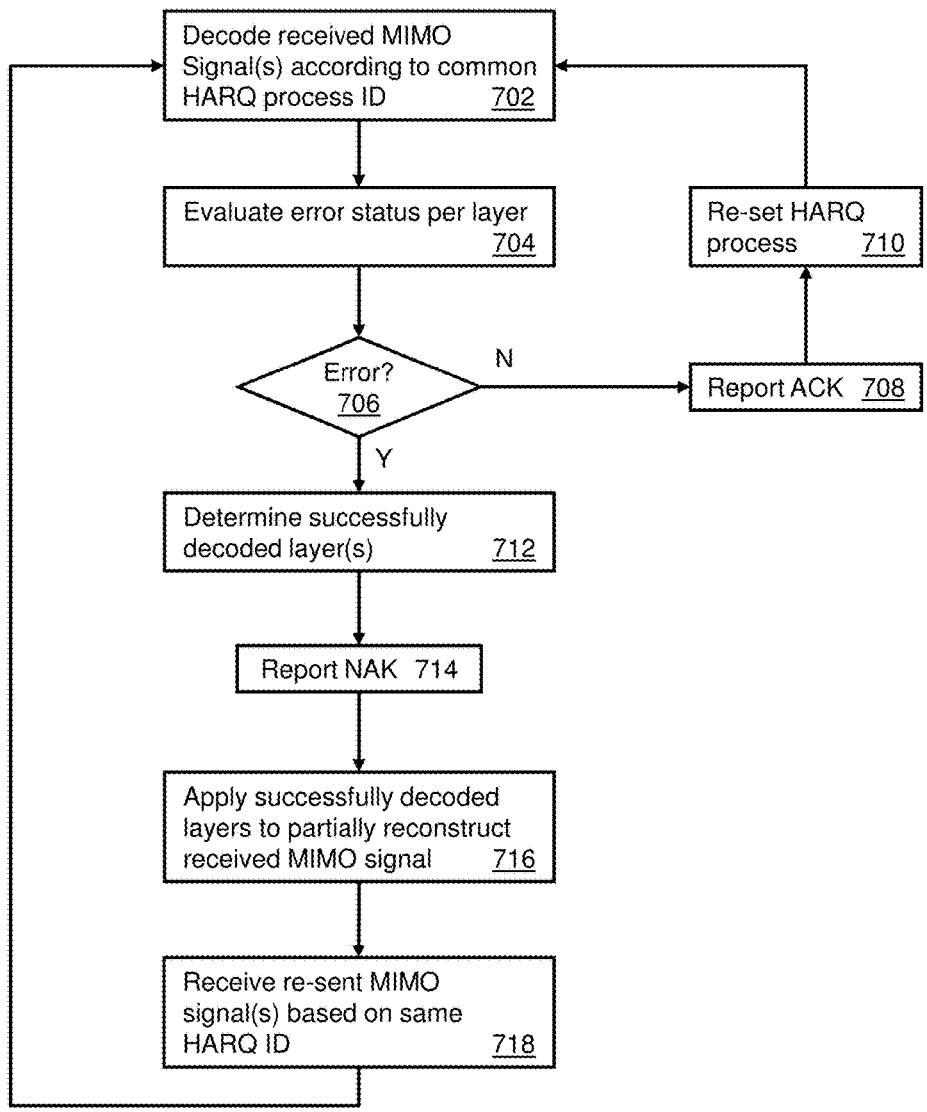
FIG. 7 depicts an illustrative embodiment of processing steps of a MIMO receive processor of the systems described in FIGS. 1-2 and 4.

FIG. 7 depicts an illustrative embodiment of another process 700 used in portions of the system described in FIGS. 1-5. MIMO signals re received by one or more antennas of a receiving wireless terminal 102b (FIG. 1). The MIMO signals including multiple layers or streams are decoded in association with a common HARQ process, e.g., determined according to a HARQ ID. It is understood that the received MIMO signals originated at a MIMO transmitter 102a (FIG. 1), incorporating one or more of the processing details of the transmit processor 300 (FIG. 3) and/or in association with the example process 600 (FIG. 6). Accordingly, transport blocks of a particular group of transport blocks transmitted/received within the same time interval, are associated with one or more MIMO layers.

To the extent that the particular MIMO layers originated with respective channel-encoded codewords, errors can be detected or otherwise evaluated on a per-layer basis at 704. For example, a receiver can determine errors according to the appropriate error detection, e.g., CRC, applied by the transmitter. It is understood that channel coding techniques, including forward error correction, e.g., turbo coding, can be processed or otherwise evaluated at the receiver. In this regard, some errors encountered during transmission across the physical channel can be corrected according to the error correcting techniques, such that an error check will determine that the particular block was received without error. However, it is understood that in at least some situations, even forward error correction will not be sufficient to correct all errors, such that application of the error check will identify a particular block as containing errors.

To the extent that no errors are detected at 706, in any layers associated with a particular HARQ process ID, an ACK can be reported to the transmitter at 708. Additionally, any resources, such as HARQ buffers associated with the particular HARQ process ID are cleared or otherwise reset at 710. Processing can continue from 702, based on subsequent MIMO signals according to another HARQ process ID and associated with another group of transport blocks of the transport data.

To the extent that one or more errors of a particular HARQ process ID are determined at 706, one or more of error-free layers and/or layers with errors of the particular HARQ process ID are identified at 712. A NAK is reported, e.g., to the transmitter, at 714 to signify the presence of errors and to initiate a re-send and/or further processing if an allowable number of re-sends has been met and/or exceeded.

According to serial or successive interference cancellation, one or more layers received without errors can be applied to at least partially reconstruct a received MIMO signal at 716. In response to the NAK, a transmitter can re-send a new MIMO signals based on at least some of the same transport blocks and associated with the same HARQ process ID. Any re-sent signals are received at 718 and a determination is made whether they relate to the same HARQ ID. To the extent they do, the process repeats from 702 until either the particular group of transport blocks associated with the HARQ ID are successfully identified, or an error and/or re-try threshold has been met and/or exceeded.

While for purposes of simplicity of explanation, the respective processes are shown and described as a series of blocks in FIGS. 6-7, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methods described herein.

By way of example, a first logical codeword LCW-1, includes a combination of channel-encoded codewords CW1-1', CW2-1', CW3-1' of the MIMO layers, based on a first group of transport blocks and associated with the same ARQ process ID. In some embodiments, each of the channel-encoded codewords is of equal length, with the number of channel-encoded codewords corresponding to the number of MIMO layers, such that a ratio of channel-encoded codewords (or transport blocks) of a common HARQ ID process to the number of layers is equal to 1. Alternatively or in addition, it is understood that in at least some embodiments, a ratio of the number of channel-encoded codewords to the number of layers is not equal to 1. For example, a ratio of the number of channel-encoded codewords to layers is 1/2, resulting in a ratio of two transport blocks to layer. Other ratios, such as 1/3, 1/4, 1/5, 1/6, etc., are possible.

Continuing with the illustrative example, if an error is detected in association with channel-encoded codeword CW2', e.g., resulting from a fading channel, then an associated HARQ process at the receiver processor 400 (FIG. 4) can provide a NAK to a transmit processor 300 (FIG. 3) based on the failure. In at least some embodiments, the NAK can include an indication as to which channel-encoded codewords, corresponding to layer or layers (transport blocks) were not correctly received. In this example, the NAK would indicate that CW2' (Layer 2) of the logical codeword LCW failed, e.g., as NAK-L2. The transmit processor 300, in response to the NAK-L2, determines which layer, i.e., Layer 2, was received unsuccessfully, and in response, generates another logical codeword LCW-1a for retransmission that includes a at least a portion of the transport block received in error, i.e., TB-2 encoded in logical codeword CW2' of Layer 2.

In some embodiments, the logical codeword LCW-1a of the retransmission is substantially identical to the original logical codeword LCW-1, e.g., with Layer 1 including stream CW1', Layer 2 including stream CW2', and Layer 3 including stream CW3'. The receiver, on the other hand, having determined according to the HARQ-1 process that at least some of the layers, i.e., Layers 1 and 3, have been received successfully, can remove or otherwise ignore information form these layers in processing of the codeword LCW-1a for retransmission according to the SIC process. To the extent that at least the second layer is received successfully, e.g., passes CRC process, then the SIC process can be used to incorporate the correctly received data, essentially ignoring results from CRCs of Layers 1 and 3, which were already successfully received.

Alternatively or in addition, the logical codeword LCW-1a of the retransmission differs from the original logical codeword LCW-1. For example, with one or more of the correctly received layers, i.e., Layers 1 and/or 3, not including a copy of the original stream CW1' and/or stream CW3'. The receiver, on the other hand, having determined according to the HARQ-1 process that at least some of the layers, i.e., Layers 1 and 3, have been received successfully, can remove or otherwise ignore information form these layers in processing of the re-transmitted codeword LCW-2 according to the SIC process. To the extent that at least the second layer is received successfully, e.g., passes CRC process, then the SIC process can be used to incorporate the correctly received data, essentially ignoring results from CRCs of Layers 1 and 3, which were already successfully received.

In at least some embodiments, the transmit processor 300 resends the same logical codeword LCW-1 in response to the NAK. Alternatively or in addition, the transmit processor 300 generates a new LCW including the layer received with a detected error, L2, and without at least one of the layer(s) received without at detected error, e.g., L1 and/or L2. For example, error-free layers can be zeroed out and/or replaced with some other code, e.g., a predetermined patterns of 1's and 0's, modulation symbols, and the like.

Alternatively or in addition, the transmit processor 300 generates a new logical codeword LCW-1a that includes the layer detected with errors associated with a different layer. Thus, CW2', associated with layer 2 can be aligned in place of former CW1' and/or CW3' in the logical codeword LCW-1a. For example, the transmit processor 300 can track associations of transport blocks and/or channel-encoded codewords with locations of the logical codeword LCW-1.

In at least some embodiments, the transmit processor 300 and/or a separate configuration server, processor and/or module can implement pre-programmed rules in association with responses to NAKs. For example, the rules can determine any of the associations disclosed herein in relation to one or more of the channel-encoded codewords and/or the logical codeword LCW, such as re-mappings and the like. Such rules can be based on one or more of network traffic, time of day, level of service, prior results, data priority, user priority, and the like.

In at least some embodiments, the transmit processor 300 generates a revised logical codeword LCW-1a for re-sending a failed layer and/or transport block on more than one layer. In the foregoing example, in which CW1' and CW3' are detected error free, whereas, CW2' is detected with an error, the revised logical codeword previously based on {CW1', CW2', CW3' }, each having equal length, can be replaced with {CW2', CW2', CW3'}, or {CW1', CW2', CW2'}, or {CW2', CW2', CW2'}. In this manner, other layers associated with correctly detected transport blocks are used to include redundant copies of transport block(s) associated with transport block(s) detected with errors.

Figure 8:
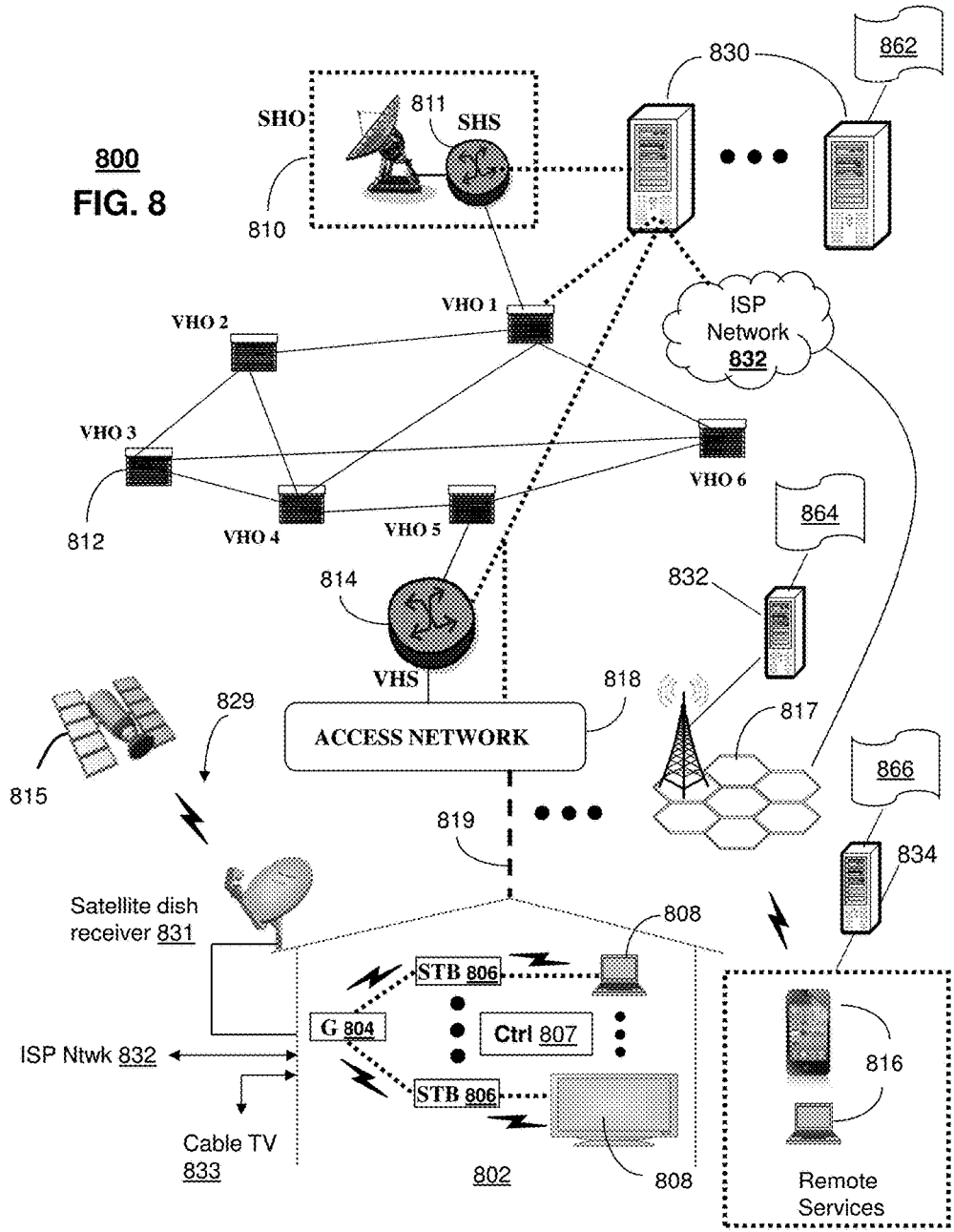
FIG. 8 depicts an illustrative embodiments of a communication system that provides media services according to portions of the systems described in FIGS. 1-5 and according to one or more of the processes of FIGS. 6-7.

FIG. 8 depicts an illustrative embodiment of a communication system 800 for providing various communication services, such as delivering media content. The communication system 800 can represent an interactive media network, such as an interactive television system (e.g., an Internet Protocol Television (IPTV) media system). Communication system 800 can be overlaid or operably coupled with one or more of the systems 100, 200, 300, 400, 500 of FIGS. 1-5, as another representative embodiment of communication system 800. For instance, one or more devices illustrated in the communication system 800 of FIG. 8. A first number of channel-encoded codewords is obtained based on a first group of transport blocks, and a first logical codeword is identified based on the first group of channel-encoded codewords and associated with one HARQ identifier. The first logical codeword is associated with multiple layers of a MIMO system to obtain a logical codeword mapping. A receiver detects the MIMO signal and obtains independent error detection results for each of the channel-encoded codewords. In response to detecting an error in one of the channel-encoded codewords, a modified first logical codeword is generated based on the one channel-encoded codeword and mapped to the number of layers of the MIMOs system for transmission to the receiver for further processing associated with the HARQ identifier.

In one or more embodiments, the communication system 800 can include a super head-end office (SHO) 810 with at least one super headend office server (SHS) 811 which receives media content from satellite and/or terrestrial communication systems. In the present context, media content can represent, for example, audio content, moving image content such as 2D or 3D videos, video games, virtual reality content, still image content, and combinations thereof. The SHS server 811 can forward packets associated with the media content to one or more video head-end servers (VHS) 814 via a network of video head-end offices (VHO) 812 according to a multicast communication protocol. The VHS 814 can distribute multimedia broadcast content via an access network 818 to commercial and/or residential buildings 802 housing a gateway 804 (such as a residential or commercial gateway).

The access network 818 can represent a group of digital subscriber line access multiplexers (DSLAMs) located in a central office or a service area interface that provide broadband services over fiber optical links or copper twisted pairs 819 to buildings 802. The gateway 804 can use communication technology to distribute broadcast signals to media processors 806 such as Set-Top Boxes (STBs) which in turn present broadcast channels to media devices 808 such as computers or television sets managed in some instances by a media controller 807 (such as an infrared or RF remote controller).

The gateway 804, the media processors 806, and media devices 808 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 806 and subsystems of the IPTV media system for services such as video-on-demand (VoD), browsing an electronic programming guide (EPG), or other infrastructure services.

A satellite broadcast television system 829 can be used in the media system of FIG. 8. The satellite broadcast television system can be overlaid, operably coupled with, or replace the IPTV system as another representative embodiment of communication system 800. In this embodiment, signals transmitted by a satellite 815 that include media content can be received by a satellite dish receiver 831 coupled to the building 802. Modulated signals received by the satellite dish receiver 831 can be transferred to the media processors 806 for demodulating, decoding, encoding, and/or distributing broadcast channels to the media devices 808. The media processors 806 can be equipped with a broadband port to an Internet Service Provider (ISP) network 832 to enable interactive services such as VoD and EPG as described above.

In yet another embodiment, an analog or digital cable broadcast distribution system such as cable TV system 833 can be overlaid, operably coupled with, or replace the IPTV system and/or the satellite TV system as another representative embodiment of communication system 800. In this embodiment, the cable TV system 833 can also provide Internet, telephony, and interactive media services. System 800 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 830, a portion of which can operate as a web server for providing web portal services over the ISP network 832 to wireline media devices 808 or wireless communication devices 816.

Communication system 800 can also provide for all or a portion of the computing devices 830 to function as a configuration controller. The configuration controller 830 can use computing and communication technology to perform function 862, which can include among other things, configuration control techniques described by one or more of the processes 600-700 of FIGS. 6-7, e.g., establishing rules, determining network feedback in association with such rules, and the like.

Multiple forms of media services can be offered to media devices over landline technologies such as those described above. Additionally, media services can be offered to media devices by way of a wireless access base station 817 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

In some embodiments, the wireless access base station 817 includes a transmit processor 832 that implements a function 864 that can be similar to the functions described for the transmit processors 108*a*, 300 of FIGS. 1 and 3, in accordance with the process 600 of FIG. 6. Likewise, one or more of the wireless devices 816 include a receive processor 834 that implements a function 866 that can be similar to the functions described for the receive processors 108*b*, 400 of FIGS. 1 and 4, in accordance with the process 700 of FIG. 7. The transmit and/or receive processors 832, 834 can be provisioned with software functions 864 and 866, respectively, to utilize the services of the configuration processor 830. For instance, functions 864 and 866 of media processors 806 and wireless communication devices 816 can be similar to the functions described for the communication wireless terminals 102*a*, 102*b*, base station 202 and wireless terminal 204 of FIGS. 1-2 in accordance with one or more of the processes 600-700 of FIGS. 6-7.

Figure 9:
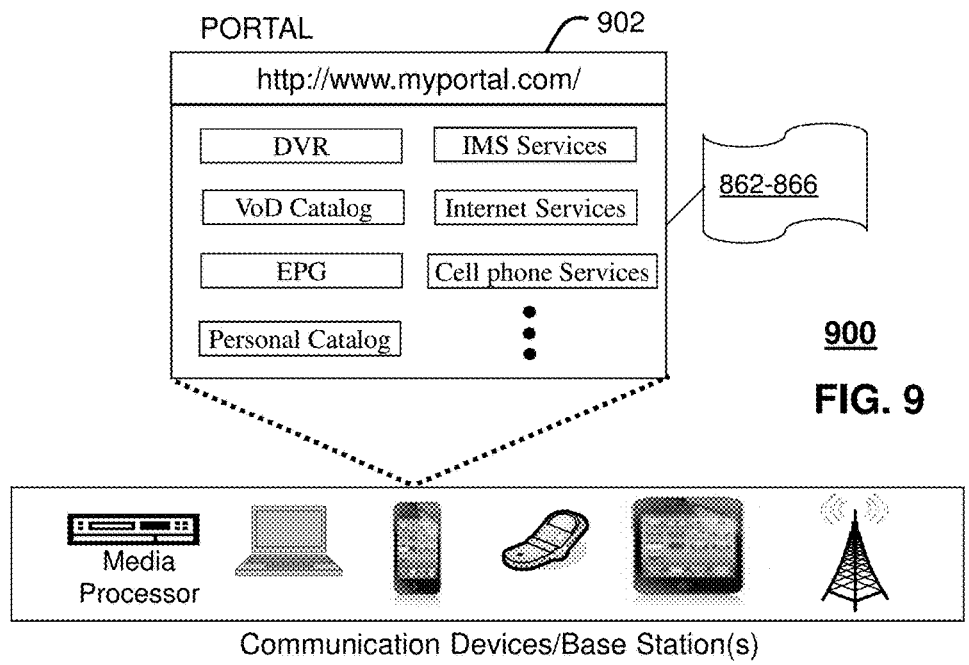
FIG. 9 depicts an illustrative embodiment of a web portal for interacting with portions of the systems described in FIGS. 1-5, and 8.

FIG. 9 depicts an illustrative embodiment of a web portal 902 of a communication system 900. Communication system 900 can be overlaid or operably coupled with systems 100, 200, 300, 400, 500 of FIGS. 1-5, communication system 800, and/or communication system 700 as another representative embodiment of systems 100, 200, 300, 400, 500 of FIGS. 1-5, and/or communication system 800. The web portal 902 can be used for managing services of systems 100, 200, 300, 400, 500 of FIGS. 1-5 and communication system 800. A web page of the web portal 902 can be accessed by a Uniform Resource Locator (URL) with an Internet browser using an Internet-capable communication device such as those described in FIGS. 1-5 and FIG. 8. The web portal 902 can be configured, for example, to access a media processor 806 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 806. The web portal 902 can also be used for provisioning IMS services described earlier, provisioning Internet services, provisioning cellular phone services, and so on.

The web portal 902 can further be utilized to manage and provision software applications 862-866 to adapt these applications as can be desired by subscribers and/or service providers of systems 100, 200, 300, 400, 500 of FIGS. 1-5, and communication system 800. For instance, users of the services provided by transmit processor 300, the receive processor 400 and/or the configuration server 830 can log into their on-line accounts and provision the servers 110 or server 830 with rules related to error handling, transport block sizes, numbers of retry attempts, user profiles, provide contact information to server to enable it to communication with devices described in FIGS. 1-5 and FIG. 8, and so on. Service providers can log onto an administrator account to provision, monitor and/or maintain the systems 100, 200, 300, 400, 500 of FIGS. 1-5 or server 830.

Figure 10:
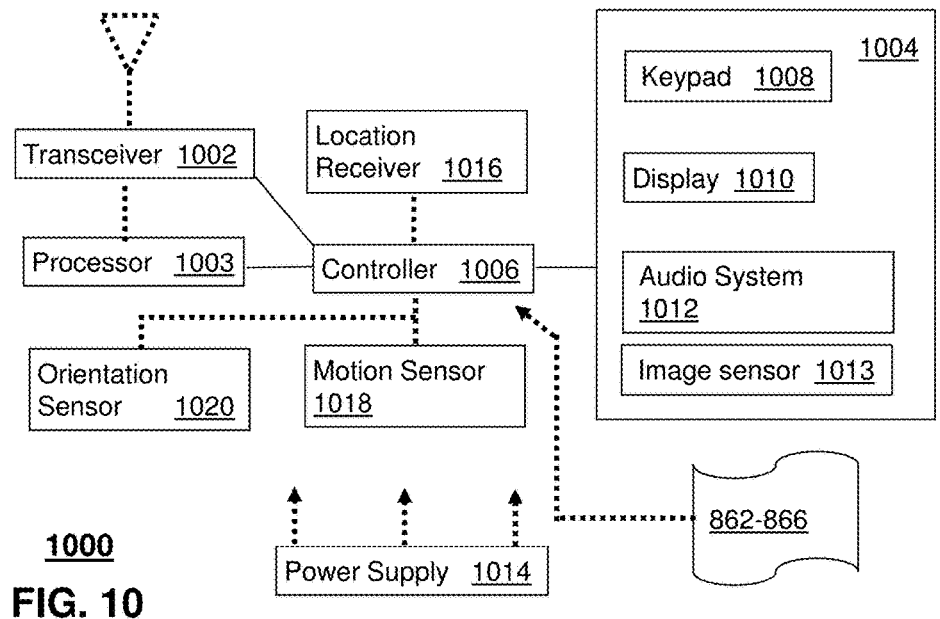
FIG. 10 depicts an illustrative embodiment of a communication device.

FIG. 10 depicts an illustrative embodiment of a communication device 700. Communication device 1000 can serve in whole or in part as an illustrative embodiment of the devices depicted in FIGS. 1-5, and/or FIG. 8 and can be configured to perform portions of one or more of the processes of FIGS. 6-7.

Communication device 1000 can comprise a wireline and/or wireless transceiver 1002 (herein transceiver 1002), a transmit and/or receive processor (herein processor 1003), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of devices of FIGS. 1-5 and/or FIG. 8, the media processor 806, the media devices 808, or the portable communication devices 816 of FIG. 8, as well as the IMS CDs 701-702 and PSTN CDs 703-705 of FIG. 7. It will be appreciated that the communication device 1000 can also represent other devices that can operate in systems of FIGS. 1-5 and/or FIG. 8, communication systems 800-700 of FIGS. 8-7 such as a gaming console and a media player. In addition, the controller 1006 can be adapted in various embodiments to perform the functions 862-866, respectively.

Upon reviewing the aforementioned embodiments, it would be evident to an artisan with ordinary skill in the art that said embodiments can be modified, reduced, or enhanced without departing from the scope of the claims described below. For example, the techniques disclosed herein can be applied with error correction, but without channel encoding. Alternatively or in addition, although the techniques disclosed herein in association with an example MIMO system, it is understood more generally that they can be applied to other wireless systems and/or to wired systems, such as bundled twisted cable pair. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
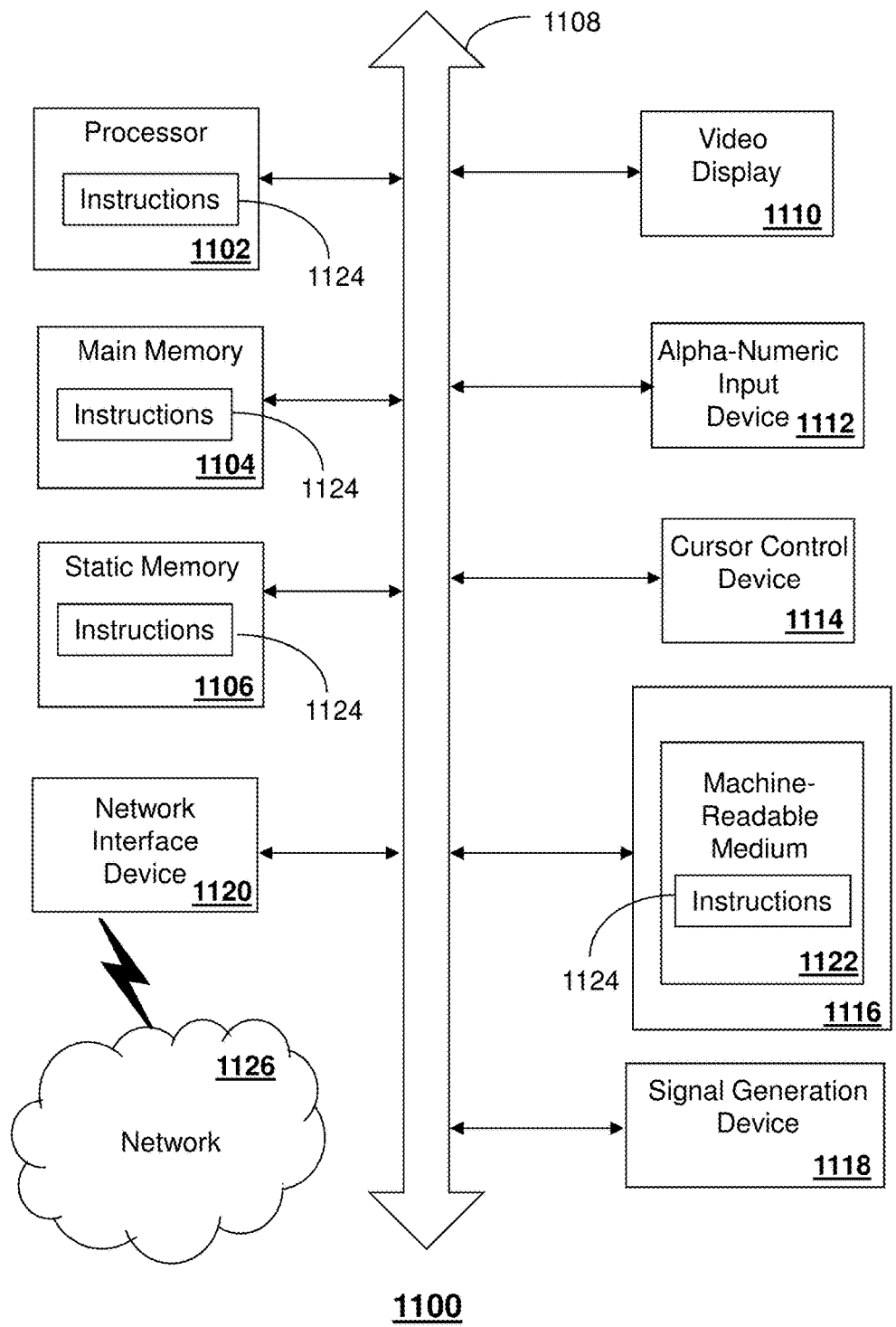
FIG. 11 is a diagrammatic representation of a machine in the form of a computer system within which a set of instructions, when executed, can cause the machine to perform any one or more of the methods described herein.

FIG. 11 depicts an exemplary diagrammatic representation of a machine in the form of a computer system 1100 within which a set of instructions, when executed, can cause the machine to perform any one or more of the methods described above. One or more instances of the machine can operate, for example, as the configuration server 830, the media processor 806, the wireless terminals 102*a*, 102*b*, 204 the base station 202, the transmit processor 300, the receive processor 400 and other devices of FIGS. 1-5 and 8-10. In some embodiments, the machine can be connected (e.g., using a network 1126) to other machines. In a networked deployment, the machine can operate in the capacity of a server or a client user machine in a server-client user network environment, or as a peer machine in a peer-to-peer (or distributed) network environment.

The machine can comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 can include a processor (or controller) 1102 (e.g., a central processing unit (CPU)), a graphics processing unit (GPU, or both), a main memory 1104 and a static memory 1106, which communicate with each other via a bus 1108. The computer system 1100 can further include a display unit 1110 (e.g., a liquid crystal display (LCD), a flat panel, or a solid state display). The computer system 1100 can include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure can in part be shown in a first of the display units 1110, while the remaining portion is presented in a second of the display units 1110.

The disk drive unit 1116 can include a tangible computer-readable storage medium 1122 on which is stored one or more sets of instructions (e.g., software 1124) embodying any one or more of the methods or functions described herein, including those methods illustrated above. The instructions 1124 can also reside, completely or at least partially, within the main memory 1104, the static memory 1106, and/or within the processor 1102 during execution thereof by the computer system 1100. The main memory 1104 and the processor 1102 also can constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which can include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods can perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments can be utilized and derived therefrom, such that structural and logical substitutions and changes can be made without departing from the scope of this disclosure. Figures are also merely representational and cannot be drawn to scale. Certain proportions thereof can be exaggerated, while others can be minimized. Accordingly, the specification and drawings are to be regarded in an illustrative rather than a restrictive sense.

Although specific embodiments have been illustrated and described herein, it should be appreciated that any arrangement which achieves the same or similar purpose can be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment can support one or more virtual machines representing computers, servers, or other computing devices. In such virtual machines, components such as microprocessors and storage devices can be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
obtaining, by a processing system including a processor, a first plurality of transport data blocks;
generating, by the processing system, a first plurality of channel-encoded codewords based on the first plurality of transport data blocks;
generating, by the processing system, a first logical codeword based on the first plurality of channel-encoded codewords;
associating, by the processing system, the first logical codeword with one hybrid automatic-receive-request (HARQ) process identifier, wherein each of the first plurality of channel-encoded codewords, based on its association with the first logical codeword, is also associated with the one HARQ process identifier;
mapping, by the processing system, the first logical codeword to a plurality of layers of a multiple-input-multiple-output (MIMO) spatial multiplexing system to obtain a logical codeword mapping, wherein a MIMO signal is wirelessly transmitted to a receiver configured to perform MIMO detection of the MIMO signal and to obtain independent error detection results for each of the channel-encoded codewords of the first logical codeword; and
in response to detecting a negative acknowledgment (NAK) responsive to the independent error detection results identifying an error in one channel-encoded codeword of the first plurality of channel-encoded codewords of the first logical codeword:

generating, by the processing system, a modified first logical codeword based on the one channel-encoded codeword of the first plurality of channel-encoded codewords, wherein the modified first logical codeword is associated with the one HARQ process identifier, and wherein the modified first logical codeword is mapped to the plurality of layers of the MIMO spatial multiplexing system for transmission to the receiver for further processing associated with the HARQ process identifier.

2. The method of claim 1, wherein the generating of the modified first logical codeword comprises:
identifying, by the processing system, the one channel-encoded codeword of the first plurality of channel-encoded codewords of the first logical codeword; and
generating, by the processing system, a second plurality of channel-encoded codewords comprising the one channel-encoded codeword of the first plurality of channel-encoded codewords, wherein the modified first logical codeword is based on the second plurality of channel-encoded codewords.

3. The method of claim 2, wherein the generating of the second plurality of channel-encoded codewords further comprises:
including, by the processing system, more than one copies of the one channel-encoded codeword of the first plurality of channel-encoded codewords of the first logical codeword.

4. The method of claim 1, wherein the generating of the modified first logical codeword is based on the first plurality of channel-encoded codewords.

5. The method of claim 1, wherein the first plurality of channel-encoded codewords are equal length.

6. The method of claim 1, wherein a total number of the first plurality of transport data blocks is equivalent to a total number of the plurality of layers of the MIMO spatial multiplexing system.

7. The method of claim 1, wherein a ratio of a total number of the plurality of layers of the MIMO spatial multiplexing system to a total number of the first plurality of transport data blocks is an integer value greater than one.

8. A device, comprising:
a processing system including a processor; and
a memory that stores executable instructions that, when executed by the processing system, facilitate performance of operations, comprising:
generating a first plurality of channel-encoded codewords based on a first plurality of transport data blocks;
determining a first logical codeword based on the first plurality of channel-encoded codewords;
associating the first logical codeword with one hybrid automatic-receive-request (HARQ) process identifier, wherein each of the first plurality of channel-encoded codewords, based on its association with the first logical codeword, is also associated with the one HARQ process identifier;
mapping the first logical codeword to a plurality of layers of a multiple-input-multiple-output (MIMO) spatial multiplexing system to obtain a logical codeword mapping, wherein a MIMO signal is wirelessly transmitted to a receiver configured to perform MIMO detection of the MIMO signal and to obtain independent error detection results for each of the channel-encoded codewords of the first logical codeword; and in response to a detection of an error responsive to the independent error detection results identifying an error in one channel-encoded codeword of the first plurality of channel-encoded codewords of the first logical codeword:
determining a modified first logical codeword based on the one channel-encoded codeword of the first plurality of channel-encoded codewords, wherein the modified first logical codeword is associated with the one HARQ process identifier, and wherein the modified first logical codeword is mapped to the plurality of layers of the MIMO spatial multiplexing system for transmission to the receiver for further processing associated with the HARQ process identifier.

9. The device of claim 8, wherein the determining of the modified first logical codeword comprises:
identifying the one channel-encoded codeword of the first plurality of channel-encoded codewords of the first logical codeword; and
determining a second plurality of channel-encoded codewords comprising the one channel-encoded codeword of the first plurality of channel-encoded codewords, wherein the modified first logical codeword is based on the second plurality of channel-encoded codewords.

10. The device of claim 9, wherein the determining of the second plurality of channel-encoded codewords further comprises:
including more than one copies of the one channel-encoded codeword of the first plurality of channel-encoded codewords of the first logical codeword.

11. The device of claim 8, wherein the determining of the modified first logical codeword is based on the first plurality of channel-encoded codewords.

12. The device of claim 8, wherein the first plurality of channel-encoded codewords are equal length.

13. The device of claim 8, wherein a total number of the first plurality of transport data blocks is equivalent to a total number of the plurality of layers of the MIMO spatial multiplexing system.

14. The device of claim 8, wherein a ratio of a total number of the plurality of layers of the MIMO spatial multiplexing system to a total number of the first plurality of transport data blocks is an integer value greater than one.

15. A machine-readable storage medium, comprising executable instructions that, when executed by a processing system including a processor, facilitate performance of operations, comprising:
obtaining a first plurality of channel-encoded codewords based on a first plurality of transport data blocks;
identifying a first logical codeword based on the first plurality of channel-encoded codewords;
associating the first logical codeword with one hybrid automatic-receive-request (HARQ) process identifier, wherein each of the first plurality of channel-encoded codewords, based on its association with the first logical codeword, is also associated with the one HARQ process identifier;
associating the first logical codeword with a plurality of layers of a multiple-input-multiple-output (MIMO) spatial multiplexing system to obtain a logical codeword mapping, wherein a MIMO signal is wirelessly transmitted to a receiver configured to perform MIMO detection of the MIMO signal and to obtain independent error detection results for each of the channel-encoded codewords of the first logical codeword; and
in response to the independent error detection results identifying an error in one channel-encoded codeword of the first plurality of channel-encoded codewords of the first logical codeword:
generating a modified first logical codeword based on the one channel-encoded codeword of the first plurality of channel-encoded codewords, wherein the modified first logical codeword is associated with the one HARQ process identifier, and wherein the modified first logical codeword is mapped to the plurality of layers of the MIMO spatial multiplexing system for transmission to the receiver for further processing associated with the HARQ process identifier.

16. The machine-readable storage medium of claim 15, wherein the identifying of the modified first logical codeword comprises:
identifying the one channel-encoded codeword of the first plurality of channel-encoded codewords of the first logical codeword; and
determining a second plurality of channel-encoded codewords comprising the one channel-encoded codeword of the first plurality of channel-encoded codewords, wherein the modified first logical codeword is based on the second plurality of channel-encoded codewords.

17. The machine-readable storage medium of claim 16, wherein the determining of the second plurality of channel-encoded codewords further comprises:
including more than one copies of the one channel-encoded codeword of the first plurality of channel-encoded codewords of the first logical codeword.

18. The machine-readable storage medium of claim 15, wherein the generating of the modified first logical codeword is based on the first plurality of channel-encoded codewords.

19. The machine-readable storage medium of claim 15, wherein the first plurality of channel-encoded codewords are equal length.

20. The machine-readable storage medium of claim 15, wherein a total number of the first plurality of transport data blocks is equivalent to a total number of the plurality of layers of the MIMO spatial multiplexing system.

* * * * *